Oct. 16, 1951 R. W. JONES 2,571,250

PARTY LINE SELECTIVE SIGNALING SYSTEM HAVING CODE CALL

Filed Dec. 30, 1947 4 Sheets-Sheet 1

INVENTOR.
Roy W. Jones

BY

Atty.

INVENTOR.
Roy W. Jones

BY Chas. Le. Candy.
Atty

INVENTOR.
Roy W. Jones
BY
Chas. W. Canty
Atty.

INVENTOR.
Roy W. Jones
BY
Atty.

Patented Oct. 16, 1951 2,571,250

UNITED STATES PATENT OFFICE 2,571,250

PARTY LINE SELECTIVE SIGNALING SYSTEM HAVING CODE CALL

Roy W. Jones, Rochester, N. Y., assignor to Automatic Electric Laboratories, Inc., Chicago, Ill., a corporation of Delaware Application December 30, 1947, Serial No. 794,482

13 Claims. (Cl. 179—17)

This invention relates to automatic telephone systems in general, but is concerned more particularly with small systems of the type which are commonly known as private automatic exchanges, or as a P. A. X. Exchanges of this nature are usually installed by private concerns, and in order to meet the more exacting requirement of the subscriber in these small systems, it is often necessary to provide certain special features which are unnecessary in a large public exchange. The present invention is concerned with certain of said special features commonly known as code call and executive cut-in.

The principal object of the invention is to provide the above-named features without materially increasing the cost of the equipment, while retaining simple, efficient and modern high-class telephone service.

A feature of the invention relates to certain new and improved circuit arrangements, whereby, code call, executive cut-in and local-to-local service are provided for satisfactory service.

Another feature relates to code call service, whereby, the code call number is dialed and a rotary switch is operated responsive to said dialing. Upon receipt of the first digital series of pulses, the switch operates and selects one of a first group of storage relays for storage of the first digit dialed. The switch restores to normal and reoperates upon receipt of the second series of digital pulses for selecting one of a second group of storage relays for storage of the second digit dialed. The switch again restores to normal.

Other features, together with the ones named above, will be explained more in detail hereinafter, reference being had to the accompanying drawings which show by means of the usual circuit diagrams a sufficient amount of the apparatus to enable the invention to be described and understood.

Referring now to the drawings and Figures 1 to 5, inclusive:

Figure 1 shows two lines such as L–5 and L–26 with each line shown as a party line having subscribers H, H', J and J' respectively. Each subscriber's station consists of the usual and well-known equipment common to automatic systems, therefore only the ringers at each station have been shown as being connected to opposite sides of the lines. Each line contains an individual line and cut-off relay which tends to operate as a two-step relay, the first action being that of an ordinary line relay. The finder portion of one of the finder-connector links is shown, as well as the first relay of the relay call allotter. Subscriber H is assumed to be an executive and is therefore shown having a push button which provides the executive with the special services of executive cut-in. Connections are also shown connecting the executives' line to an executives' loudspeaker system such as disclosed in U. S Patent No.

2,224,477, issued December 10, 1940 to Roswell H. Herrick. The finder shows two sets of contact banks of 26 points each for terminating the line conductors, control conductors and extra control conductors, so arranged that when one set of wipers are rotated off their bank contacts the other set engages their respective contacts, the last contact of the second bank set being used as the normal, or home position.

Figure 1:
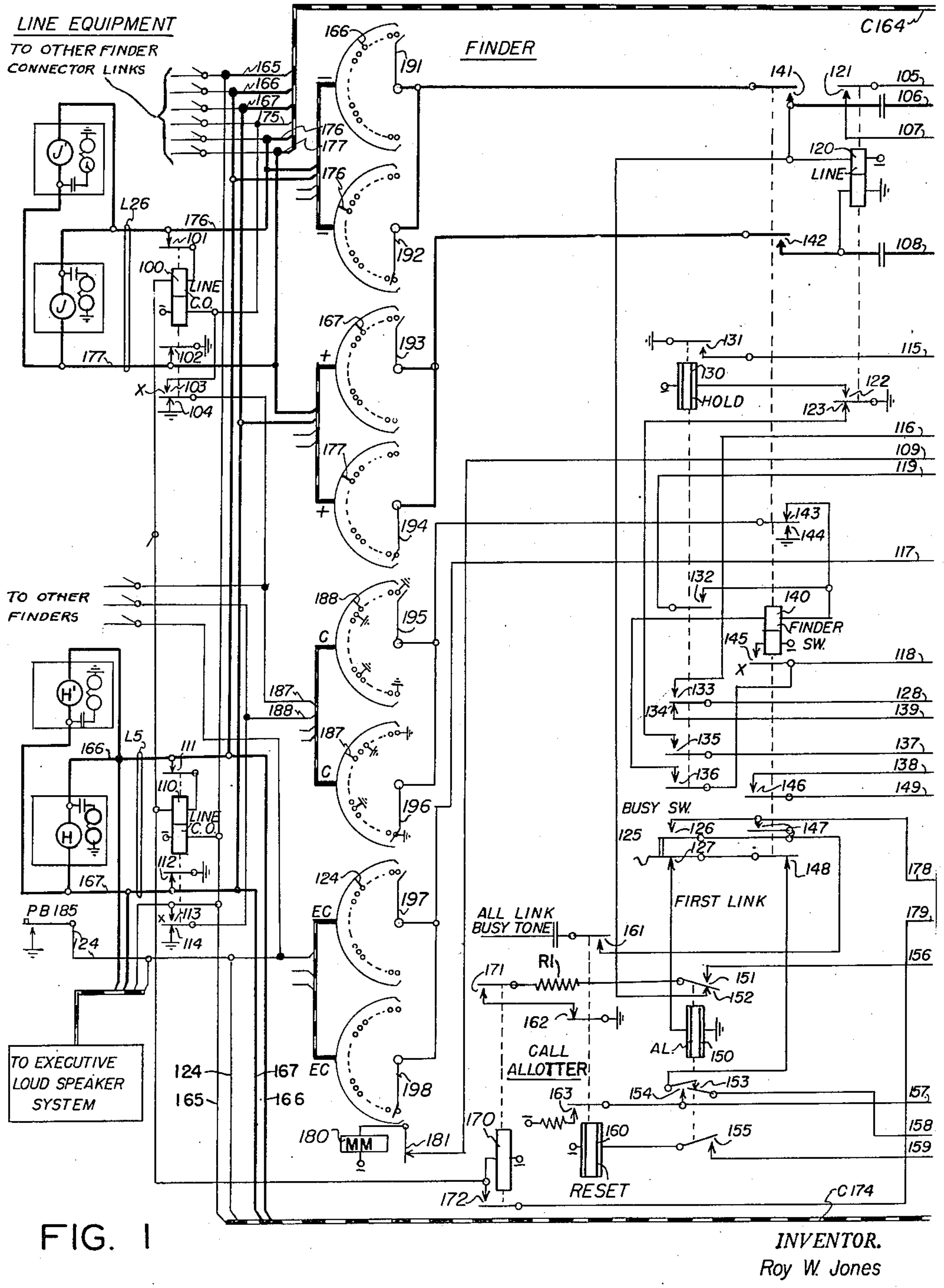
Figure 2:
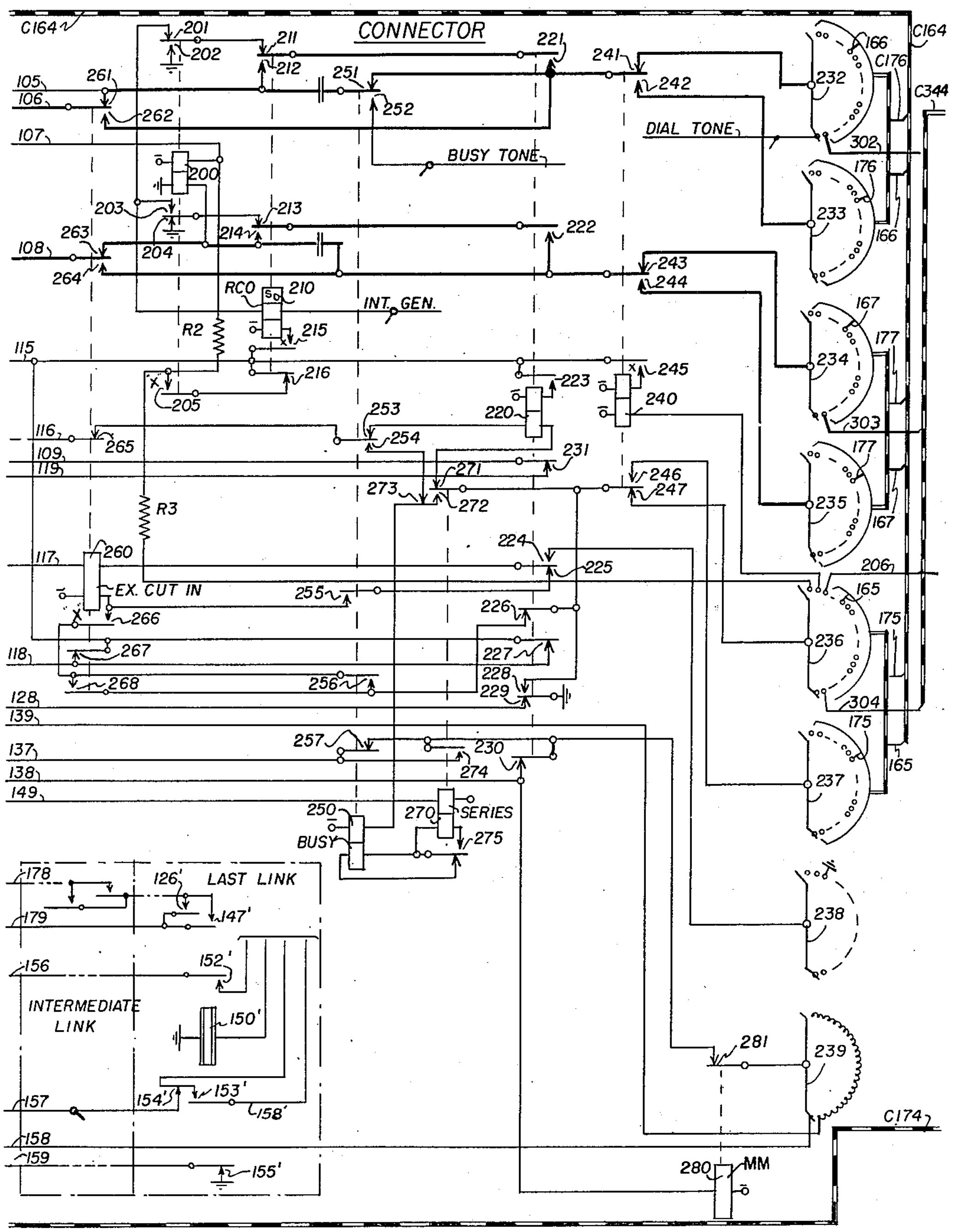
Figure 2 shows the connector portion of one of the finder-connector links, with the connector having a rotary switch of the same type and construction as the finder, except for the wipers.

Referring more particularly now to Figures 1 and 2 of the drawings, it will be seen that the first ones of the double sets of contact banks of the finder and connector serve the first group of lines and that the second set of the double contact banks serve the second group of lines. The following table has been inserted to show the relationship between the switch bank terminals and the call numbers of each line group.

TABLE.—CALL NUMBERS

| Sw. Bank Terminals | First Group of Lines | | Second Group of Lines | |
|---|---|---|---|---|
| | First Party | Second Party | First Party | Second Party |
| 1 | Ring reversing | | Ring reversing. | Not used |
| 2 | Wiper switching | | Not used | Not used |
| 3 | 3 (Code-Call Call) | ---------- | 21 | 111 |
| 4 | 4 | 13 | 22 | 112 |
| 5 | 5 | 14 | 23 | 113 |
| 6 | 6 | 15 | 24 | 114 |
| 7 | 7 | 16 | 25 | 115 |
| 8 | 8 | 17 | 26 | 116 |
| 9 | Not used | Not used | Not used | Not used |
| 10 | 91 | 181 | 271 | 1,171 |
| 11 | 92 | 182 | 272 | 1,172 |
| 12 | 93 | 183 | 273 | 1,173 |
| 13 | 94 | 184 | 274 | 1,174 |
| 14 | 95 | 185 | 275 | 1,175 |
| 15 | 96 | 186 | 276 | 1,176 |
| 16 | 97 | 187 | 277 | 1,177 |
| 17 | 98 | 188 | 278 | 1,178 |
| 18 | 99 | 189 | 279 | 1,179 |
| 19 | Not used | Not used | Not used | Not used |
| 20 | 901 | 1,801 | 2,701 | 11,701 |
| 21 | 902 | 1,802 | 2,702 | 11,702 |
| 22 | 903 | 1,803 | 2,703 | 11,703 |
| 23 | 904 | 1,804 | 2,704 | 11,704 |
| 24 | 905 | 1,805 | 2,705 | 11,705 |
| 25 | 906 (Code-Call Ans.) | ---------- | 2,706 | 11,706 |
| 26 | Normal position | | Normal position | |

In referring to the table, it will be seen that the first terminal, of the first line group switch bank, is used as a ring reversing terminal, the second terminal of the same bank is used for wiper selecting, or group selecting and the third terminal of the same bank is used to initiate a code call. Corresponding first and second terminals of the second line group switch bank are not used and the third terminal is connected to a second group line. Therefore, the first line (line 1) is actually connected to the fourth terminal of the first line group. Line 5 is connected to the 8th terminal of the first line group and contains subscriber H and H'. The 25th terminal of the first line group is used only for answering a code call and as the 9th and 19th terminals are not used, it may be seen that the first line group contains lines 1 through 19. In the second line group, the third terminal is the first to be connected to a line so therefore corresponds to line 20. Line 26 is connected to the 10th terminal and contains subscribers J and J'. The 9th and 19th terminals are not used and as the 25th terminals are, it may be seen that the second line group contains lines 20 through 40. Thus it will be noted that the system can serve a maximum of 40 two-party lines.

The call allotter is of the all-relay pre-selecting type, in that as each time a call is initiated and received, the next idle relay set in succession is used to start an idle finder hunting for the calling line. After the last link in the group has been used, it completes a chain circuit to the reset relay such as 160, which operates and completes a circuit to all the relays corresponding to 150 and 150' of idle relay sets, thus making the links preselectable to start their associated finders to hunt for the calling lines as the links are again used in succession.

The rotary switch of the finder is of the non-numerical type and is non-homing, whereas, the rotary switch of the connector is of the numerical type and restores to its home position after each time the connector is used. From the connector rotary switch it will be noted that the 25th terminals of the contact banks corresponding to the first line group are used as the code call answering terminals, while the third contact of the contact bank corresponding to the first line group of the control conductor is used for the code call initiating terminals.

It will be noted that the battery feed and ring reversal relay such as 200 serves two definite purposes; first, in that it provides talking battery potential for the called party, and second, it routes ringing current over the opposite line conductor when the second party on a party line is called, in addition to providing talking battery.

Figure 3:
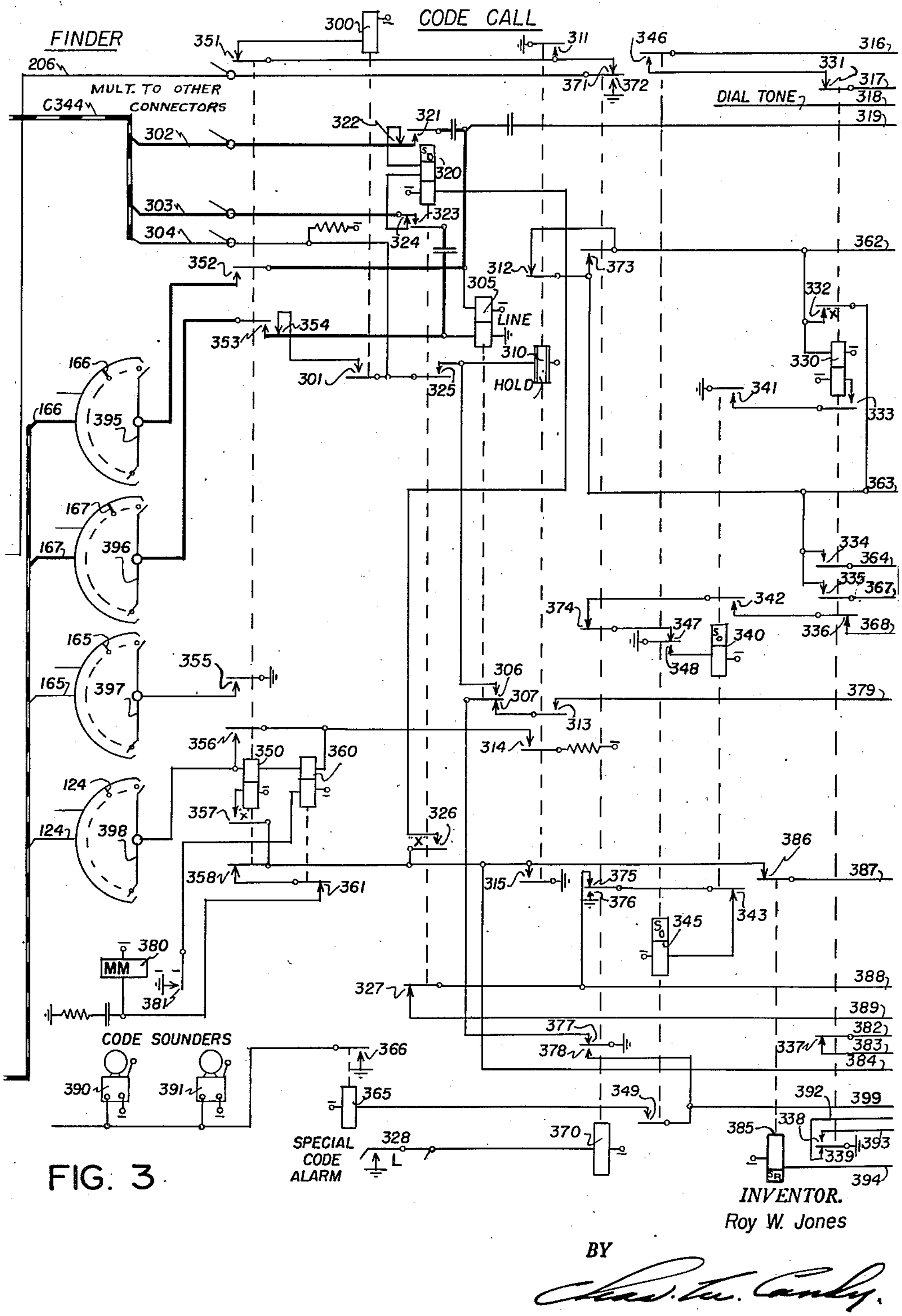
Figure 3 shows the code call finder and the code sounding apparatus of the code call equipment.
Figures 4, 5:
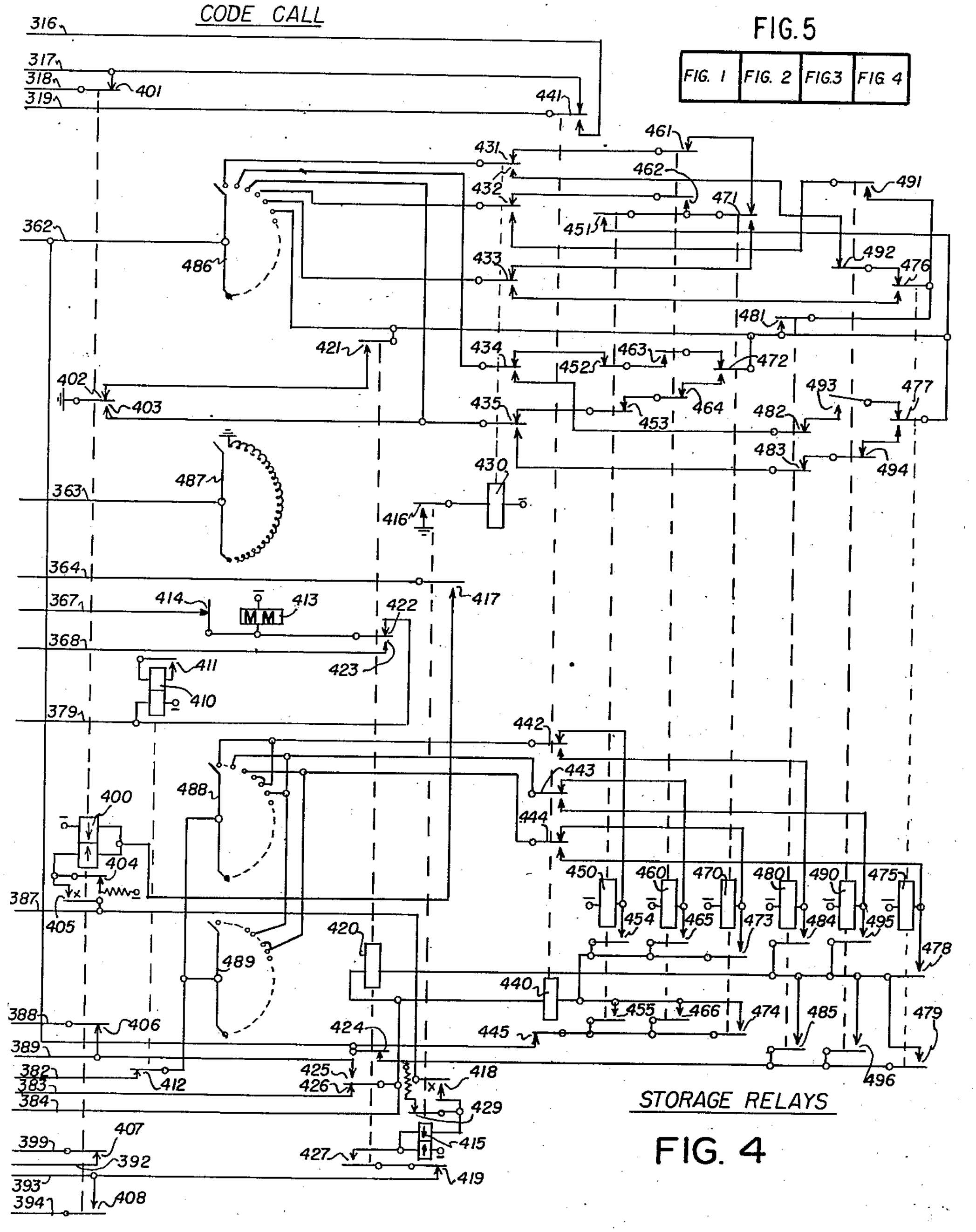
Figure 4 shows the remainder of the code calling equipment which includes the storage relays and the rotary switch.
Figure 5 is a figure-number diagram used in conjunction with the drawings, so that when the drawings are arranged as shown, the system will be better understood.

Referring now to Figures 3 and 4, it will be noted that only the subscribers having their extra control conductors, (E. C.) switch as 124 connected to the contact bank accessible by the extra control wiper such as 398 of the code call finder, can initiate a code call. Only two code sounders such as 390 and 391 have been shown, however, any determined number may be used depending upon the size and type of structures within which the exchange is installed. The rotary switch in the code call finder is shown having 50 point contact banks, however, double 26 point contact banks as shown in the regular finder (Fig. 1) may be used. The code selecting rotary switch may be any convenient size with each consecutive 7th contact being dead, only the first six contact terminals are shown connected to the equipment.

The six storage relays are divided into two groups, with relays 450, 460 and 470 in the first group and relays 480, 490 and 475 in the second group. Each code call number is a two-digit number and may range from "11" through "66," thus providing a maximum of 36 code call numbers. When dialing a code call number, the first digit operates one or more of the first group of storage relays and the second digit operates one or more of the second group of storage relays. For example: In the first group of storage relays if the digits 1, 2 or 3 are to be stored, the relays 450, 460 or 470 are operated, while if the digits 4, 5 or 6 are to be stored, the relays 450 and 460, 450 and 470 or 460 and 470 are operated. In the second group of storage relays if the digits 1, 2 or 3 are to be stored, the relays 480, 490 or 475 are operated, while if the digits 4, 5 or 6 are to be stored, the relays 480 and 490, 480 and 475 or 490 and 475 are operated.

*Local to local calls*

The ensuing description will cover the operation of the illustrated equipment in Figures 1 and 2 during the initiation and completion of a local to local call.

Referring to the above-mentioned figures, it will be noted that the negative and positive talking conductors of the first line group terminate at respective first and third bank contact sets and the negative and positive talking conductors of the second line group terminate at respective second and fourth bank contact sets. It will also be noted that the talking conductors of line L5 are connected to the eighth contacts of the banks corresponding to the first line group and the talking conductors of line L26 are connected to the tenth contacts of the banks corresponding to the second line group. It will be further noted that subscribers H and J are the first parties on their respective lines and subscribers H' and J' are the second parties on the same said lines.

Referring to the table included in the forepart of the specification, it will be seen that the call numbers of subscribers H (contact #8) and J (contact #10) are 8 and 271 respectively, while the call numbers for H' and J' are 17 and 1171 respectively.

Assuming that subscriber H, of line L5 in the first line group, desires to call subscriber J, of line L26 in the second line group, the equipment will operate in the following manner:

As subscriber H removes the receiver a loop circuit is closed across talking conductors 166 and 167, thereby, completing an operative series circuit for relays 110 and 170, this circuit extending from ground at contacts 112, line conductor 167, the closed loop, line conductor 166, contacts 111, upper winding of relay 110 and down through the winding of relay 170 to battery.

In operating "X" contacts 113, relay 110 applies a marking battery potential supplied from its lower winding over conductor 188 to the 8th contact of the bank set terminating the first line group's control conductors. As relay 110 is a combined line and cut-off two-step relay, its first step of operation is now completed. In operating contacts 171, relay 170 completes a circuit to the line relay 120, this circuit extending from ground at contacts 162, contacts 171, resistance R1, contacts 152 and up through the upper winding of relay 120 to battery. At contacts 172, a busy test circuit is completed for testing for an all-link busy condition through contacts connected in series in each relay set.

At contacts 121, relay 120 prepares a battery feed circuit for the called party, at contacts 122 an obvious circuit is completed for the hold relay 130 and at contacts 123 opens a point in the pulsing circuit.

It will be remembered that the calling line applies battery to the corresponding contact of the control bank set over conductor 188, while all idle and busy lines apply ground to their respective contacts.

In operating contacts 131, relay 130 applies a ground potential for use by other relays in the finder-connector link, at contacts 132 a circuit is completed for the motor magnet 180; this circuit extending from ground at a contact terminating the control conductor of an idle or busy line, or (as shown) the grounded 26th contact, wiper 196, contacts 143, 132, conductor 119, contacts 231, conductor 109, contacts 181 and through the winding of motor magnet 180 to battery. At contacts 133 a circuit is prepared for the cut-through relay 220, at contacts 134 the "homing" circuit for motor magnet 280 is opened and at contacts 135 a point in the pulsing circuit of magnet 280 is prepared.

In operating, motor magnet 180 opens contact 181, thereby breaking its own energizing circuit and thus the magnet 180 restores. Assuming that wipers 192, 194, 196 and 198 are resting on their respective 26th contacts and that wipers 191, 193, 195 and 197 are not engaged with any contact (as shown); as magnet 180 restores, wipers 191 through 198 inclusive are advanced one step. Wipers 191, 193, 195 and 197 then engage their respective first contacts and wipers 192, 194, 196 and 198 are not engaged with any contact. In completely restoring magnet 180 completes its own circuit at contacts 181. In operating, magnet 180 opens its circuit at contacts 181 and thus restores. In restoring, magnet 180 advances its wipers a second step and in completely restoring, completes its own circuit again at contacts 181. This self interrupted action between magnet 180 and its contacts 181 continues until it has rotated wipers 191, 193, 195 and 197 into engagement with contacts number 8 which terminate the conductors of line L5 and the calling subscriber H.

As wiper 195 engages its 8th contact, it encounters the battery potential supplied from the lower winding of the line and cut-off relay 110, thereby completing a circuit for the relay 140 through its upper winding. This circuit extending from ground at contacts 131, conductor 115, contacts 267 or 227, conductor 118, contacts 136, the upper winding of relay 140, contacts 143, wiper 195 and engaged contact, conductor 188, "X" contacts 113 and through the lower winding of relay 110 to battery.

In operating, relay 140 operates "X" contacts 145 ahead of the others and locks itself operated by way of ground at contacts 131, conductor 115, contacts 267 or 227, conductor 118, "X" contacts 145 and the lower winding of relay 140 to battery. At contacts 141 and 142 relay 140 connects the talking conductors of subscriber H to the line relay 120 and completes a dial tone circuit to the calling subscriber H, at contacts 143 the circuit through the upper winding of relay 140 is opened, at contacts 144 a circuit is completed for the second step operation of the line and cut-off relay 110, this circuit extending from ground at contacts 144 over a previously traced circuit and through the lower winding of relay 110 to battery. At contacts 146, relay 140 prepares a circuit for the series relay 270, at contacts 147 prepares a busy tone circuit for the first link (as shown) while in use and at contacts 148 opens the circuit to relay 150 of the allotter, allowing relay 150 to restore.

In completing its second step operation, relay 110 opens its original operating circuit at contacts 111 and 112 thereby allowing relay 170 to restore.

In restoring, relay 150 prepares the start circuit to the next idle link in rotation at contacts 151, at contacts 152 the previous energizing circuit to the line relay 120 is opened, at contacts 154 prepares a future circuit for itself and at contacts 155 prepares a circuit to the reset relay 160. In restoring, relay 170 opens a point in the energizing circuit of the line relay 120. Line relay 120, however, remains energized now from ground through its lower winding, the positive talking conductor, the closed loop of subscriber H, the negative talking conductor and through the upper winding of relay 120 to battery.

Upon receipt of dial tone, subscriber H prepares to dial the first digit "2" of the call number 271. Line relay 120 will operate in the usual and well-known manner and deenergize and energize two times in response to dialling digit 2. At the beginning of the first pulse, line relay 120 restores and opens the circuit to the hold relay 130 at contacts 122. Relay 130 is constructed as being slow-to-release and therefore remains operated during dialing. At contacts 123 relay 120 completes circuits to the series relay 270 and the motor magnet 280; these circuits extending from ground at contacts 123, contacts 135, conductor 137, contacts 255, 230 and (1) to the left over conductor 138, contacts 146, conductor 149 and through the upper winding of relay 270 to battery; and (2) down through the winding of motor magnet 280 to battery.

Relay 270, in operating, prepares a busy-test circuit by way of contacts 272 and at contacts 275 shunts its lower winding so that relay 270 is now slightly slow to release and thereby remains operated during the pulsing of each dialed digit. Motor magnet 280 energizes and deenergizes with each deenergization and energization of the line relay 120. Magnet 280 advances its wipers 232 through 239 inclusive a single step each time magnet 280 restores, therefore at the end of the first digit, wipers 232 through 239 inclusive are engaged with their respective second contacts.

The series relay 270 restores after the first digit has been dialed and at contacts 271 a circuit is completed for the wiper selecting relay 240; this circuit extending from ground at contacts 229, conductor 128, contacts 133, conductor 116, contacts 265, 253, the lower winding of cut-through relay 220, contacts 271, 247, wiper 236 and engaged second contact and the lower winding of relay 240 to battery. The resistances of the windings of relays 220 and 240 are so arranged that relay 220 will not operate over the above-traced circuit.

In operating "X" contacts 245, relay 240 locks itself operated by way of ground at contacts 131, conductor 115, "X" contacts 245 and through the upper winding of relay 240 to battery. At contacts 242, 244 and 246, relay 240 selects the second line group in which the called party is located.

The second digit "7" of the call number 271 is now dialed and line relay 120 restores and reoperates a total of seven times. Upon receipt of the first pulse, relay 120 operates as described before, completing a circuit to the series relay 270 and the motor magnet 280 as previously traced. Relay 270 operates as previously described and magnet 280 operates each time line relay 120 restores and restores each time line relay 120 reoperates, therefore, after receipt of all the pulses of the second digit "7," wipers 232 through 239 inclusive have been rotated an additional seven steps and are now engaged with their respective 9th contacts. Series relay 270 and motor magnet 280 have again restored.

The third and last digit "1" of the call number 271 is now dialed and the same operations occur as previously described. Motor magnet operates in response to the operations of the line relay 120 and wipers 232 through 239 are rotated one more step so that now the wipers are engaged with their respective tenth contacts of the second line group and which corresponds to the called line.

Before the series relay 270 restores a busy test circuit is completed and should the called line be busy, wiper 237 would encounter ground at its 10th contact, which terminates the control conductor of the called line; this ground would complete an operative circuit to the busy relay 250 which would be traced from wiper 237, contacts 246, 272, and through the winding of relay 250 to battery.

It is assumed, however, that the called line is not busy and therefore wiper 237 will encounter a battery potential at its 10th contact. When the series relay 270 restores, a circuit is completed for the cut-through relay 220 at contacts 271. This circuit may be traced as follows: from ground at contacts 229, conductor 128, contacts 133, conductor 116, contacts 265, 253, the lower winding of relay 220, contacts 271, 246 and wiper 237 to battery through the winding of line and cutoff relay 100 and the control conductor 175 of the called line.

In operating "X" contacts 223, relay 220 locks up from ground at contacts 131 over conductor 115, "X" contacts 223 and the upper winding of relay 220 to battery. At contacts 221 and 222, relay 220 prepares for extending the call through to the called line, and ringing current is transmitted to the called line. This ringing circuit may be traced as follows: battery from interrupted generator, through the upper winding of the ring-cut-off relay 210, contacts 201, 211, 221, 242, wiper 233 and engaged tenth contact, the negative talking conductor 176 of the called line, cable C-164, conductor 176 and through the ringer at station J to ground. At contacts 224, 225 and 226, operation of the executive cut-in relay 260 in the present busy finder-connector link is prevented. At contacts 228 a busying ground is applied to the connector control terminals for busying the called line to other connectors, at contacts 230 the pulsing circuit to the series relay 270 and the motor magnet 280 is opened and at contacts 231 a further point in the circuit to motor magnet 180 is opened.

The called line is now rung and after a reasonable period of time, the call is answered by the called party. The answering shunts the ringer and connects direct ground to the upper winding of the ring-cut-off relay 210, thereby causing the relay 210 to operate. In operating "X" contacts 215, relay 210 locks up to ground at contacts 131; at contacts 212 and 214 the extension of the call is completed and a circuit is completed to the combined battery-feed and ring reversal relay 200, this circuit extending from ground through the lower winding of relay 200, contacts 214, 222, 244, wiper 235 and engaged tenth contact, the positive talking conductor 177 of the called line, cable C164, conductor 177, the closed loop at station J, the negative talking conductor 176 of the called line, cable C164, conductor 176, wiper 233 and engaged tenth contact, contacts 242, 221, 212, 121 and through the upper winding of relay 200 to battery and at contacts 216 relay 210 opens an alternate circuit for the upper winding of relay 200.

The conversation may now proceed with the line relay 120 supplying talking battery to the calling subscriber and the battery feed relay 200 supplying talking battery to the called subscriber.

After conversation is completed, both subscribers replace their receivers and the equipment will restore in the following manner: As subscriber H replaces his receiver, line relay 120 restores, which in turn releases hold relay 130. As relay 130 restores, relays 110, 140, 210, 220 and 245 release and as either or all of the relays 210, 220 and 245 restore, relay 200 releases. In restoring contacts 229 and 230, relay 220 completes a "homing" circuit for motor magnet 280; this circuit extending from ground at contacts 229, conductor 128, contacts 134, conductor 139, the multiple connected bank contacts engaged by wiper 239, wiper 239, contacts 281, 230 and through the winding of magnet 280 to battery. Magnet 280 operates and interrupts this circuit at contacts 281, which causes magnet 280 to deenergize and step wiper 239. This interaction of magnet 280 continues until wiper 239 has engaged contact 26, which maintains the magnet circuit open, thus all wipers 232 through 239 are at normal.

The equipment is now at normal and in condition to handle future calls. Before continuing with the next section, a short description of the combined operation of the battery-feed and ring-reversal relay 200 will be covered. The operation just described covered the operation of relay 200 operating only as a battery-feed relay. Relay 200 will operate only as a ring-reversal relay when the second party of either line group is called, hence the first digit of a call number of a second party of either line group is the digit 1.

Assuming now that a calling party desires to call a second party of one of the line groups, the equipment will operate the same as just described, until the calling party dials the first digit of the call number, which now is the digit 1. After the digit 1 is dialed, line relay 120 will restore and reoperate once causing motor magnet 280 to advance its wipers 232 through 239 one step so that now the wipers have been rotated off their normal positions and engage their respective first contacts. As wiper 236 engages its first contact, an operative circuit is completed for relay 200 which may be traced from ground at contacts 229, conductor 128, contacts 133, conductor 116, contacts 265, 253, lower winding of relay 220, contacts 271, 247, wiper 236 and engaged first contact, resistance R3, resistance R2 and through the upper winding of relay 200 to battery. Relay 220 does not operate, however, due to resistances R2, R3 and the resistance of the upper winding of relay 200.

In operating "X" contacts 205, relay 200 completes an obvious locking circuit for itself, at contacts 202 and 204, ground potential is removed from the positive conductor of the called line and applied to the negative line conductor and at contacts 201 and 203 ringing current is rerouted from the negative called line conductor to the positive line conductor.

The remaining digits of the call number may now be dialed and the system will operate as previously described. As the cut-through relay 220 is operated subsequent to the completion of dialing, the closing of contacts 221 and 222 complete the now reversed ringing circuit, which may be traced as follows: battery from interrupted generator, through the upper winding of the ring cut-off relay 210, contacts 203, 213, 222, 243, wiper 234 and its engaged designated contact, the negative conductor of the called line and the ringer of the called station to ground. The system now continues to function and release (when required) as previously described.

*Executive cut-in*

Station H is shown as being assigned to an executive and is equipped with a non-locking key such as 185, which provides the executive with "executive cut-in" on busy lines. This special feature will function as described in the following paragraphs.

It will be assumed that subscriber J is busy and executive H has dialed the call number of subscriber J and received a busy tone. All operations are the same as described in the previous section up to and including completion of the busy test circuit as wiper 237 encounters the ground supplied by the seized connector link in use by subscriber J and multipled to all 10th contacts of all connectors. This circuit would energize the busy relay 250 over a path traced from ground encountered by wiper 237, contacts 246, 272 and through the winding of relay 250 to battery.

In operating contacts 252, relay 250 completes a busy tone circuit and busy tone is transmitted to the executive in a well-known manner. At contacts 253, relay 250 opens a point in the operate circuit of the cut-through relay 220. At contacts 254 relay 250 prepares a locking circuit for itself, at contacts 255 prepares a circuit for the executive cut-in relay 260, at contacts 256 prepares a locking circuit for relay 260 and at contacts 257 opens a point in the pulsing circuit.

Upon receipt of busy tone the executive may now depress his key 185 thus completing a circuit for the executive cut-in relay 260, this circuit extending from ground at key 185, conductor 124, contact 8 engaged by wiper 197, conductor 117, through the upper winding of relay 260, contacts 225, 255 and through the lower winding of relay 260 to battery. In operating "X" contacts 266, relay 260 locks itself operated over its lower winding, this circuit extending from the ground encountered by wiper 237 (from the busy line), contacts 246, 226, 256, "X" contacts 266 and through the lower winding of relay 260 to battery. At contacts 261, relay 260 removes busy tone from the executive's line, at contacts 262 and 264 the executive is directly connected with subscriber J for monitoring purposes or conversation, at contacts 265 the circuit to the busy relay 250 is opened, at contacts 267 a point in the locking circuit of relay 140 is opened and at contacts 268 a different path in the locking circuit of relay 260 is provided.

In restoring contacts 253, busy relay 250 prepares a circuit for the cut-through relay 220, at contact 255 a point in the original energizing circuit to relay 260 is opened, at contacts 256 one of the points in the locking circuit of relay 260 is opened and at contacts 257 a point in the pulsing circuit is restored.

As previously mentioned, the executive may monitor or converse with subscriber J. However, under present conditions, two finder-connector links are in use, which is normally not desired in a small exchange of this type, therefore, the executive may request subscriber J to hang up. In hanging up and releasing the present connection between subscriber J and his called party, the ground potential is removed from his control conductor 175 and replaced by battery potential, thereby removing the busy condition. As relay 260 was previously locked operated to this ground, the battery potential now encountered shunts relay 260 and it restores.

At contacts 261 and 263, relay 260 restores the connections of the talking conductors in the link to normal, at contacts 265 a circuit to the cut-through relay 220 is completed, this circuit extending from ground at contacts 229, conductor 128, contacts 133, conductor 116, contacts 265, 253, the lower winding of relay 220, contacts 271, 246 and to the battery encountered by wiper 237. At contacts 266, 267 and 268 relay 260 opens its previous locking circuit.

In operating, cut-through relay 220 operates as described in the previous section. Ringing current is now transmitted to subscriber J and upon his answering, the ring cut-off relay 210 operates as previously described. The executive may now converse with subscriber J using the normal connections employing only one finder-connector link.

Upon completion of conversation the equipment is released in the same manner as described in the previous section.

*Code call*

The following description will cover the operation of the illustrated equipment in Figures 1, 2, 3 and 4 during the initiation and completion of a code call.

Referring to the above-mentioned figures, it will be noted that only those stations whose extra control (E. C.) conductors are connected to the line finders (Fig. 1) of the finder-connector links and the code call finder (Fig. 3) of the code call equipment can establish a code call. However, a code call may be answered from any subscribers' station. It will also be noted, that for the following description the E. C. conductor 124 of the executive H is connected as described above.

In referring to the table, it will be noted that the code call initiating number is the single digit "3" and that the code call answering number is the three digit number "906."

It will be remembered that each subscriber whom it is decided to code ring is given an individual two digit code call number, these numbers may range from "11" through "66," therefore it is evident that a maximum of 36 code calls may be rung by the illustrated equipment. It will be remembered that in the code call switch shown in Figure 4, the contact banks accessible by the wipers 486 through 489 are connected as follows: the first six contacts of the bank accessible by wiper 486 are connected consecutively as shown; all but the last, or normal, contact of the bank accessible by wiper 487 are multipled and connected to ground; the first six contacts of the bank accessible by wiper 488 are connected consecutively as shown; the fourth contact of the bank accessible by wiper 489 is shown as connected to the second and sixth contacts of the bank accessible by wiper 488 and the fifth and sixth contacts are multipled and then connected to the third contact of the bank accessible by wiper 488.

Assuming now that subscriber H wishes to talk to subscriber J and that subscriber J has been given the individual code number of "22." It is also assumed that subscriber H has called subscriber J in the usual manner as described in the section entitled "Local to local calls" and has been informed that subscriber J is somewhere at large about the factory.

Subscriber H may now remove his receiver and dial the single digit "3" upon receipt of dial tone. The equipment in Figures 1 and 2 operates as described in the above-mentioned section and after the last pulse of the digit "3" is received it will be noted that motor magnet 280 has stepped its wipers 232 through 239 into engagement with their respective third contacts. As wiper 238 engages its third contact, a circuit is prepared for the relays 350 and 360. As wiper 236 engages its third contact a series energizing circuit is completed for relays 220 and 300; this circuit extending from ground at contacts 229, conductor 128, contacts 133, conductor 116, contacts 265, 253, lower winding of relay 220, contacts 271, 247, wiper 236 and engaged third contact, conductor 206, contacts 371, 351 and through the winding of relay 300 to battery.

In operating contacts 301, relay 300 completes a circuit to the line relay 305 by way of its lower winding; this circuit extending from ground through the lower winding of relay 305, contacts 354, 301 and up to battery on the control conductor 304. Relay 220 operates as described in the previous section entitled "Local to local calls."

In operating, relay 305 completes a circuit to relay 310 at contacts 306, this circuit extending from ground at contacts 377, 306 and through the winding of relay 310 to battery. In operating contacts 311, relay 310 completes an obvious holding circuit for the relay 300 and the ground at contacts 311 also serves to busy the code call finder to other initiated code calls during the present time that the code call equipment is in use. At contacts 312 a point in the energizing circuit to relay 330 is opened, at contacts 313 a circuit is prepared for relay 410, at contacts 314 an obvious circuit is prepared for relays 360 and 350 and at contacts 315 an operative circuit is completed for the finder motor magnet 380 by way of contacts 358 and 361.

Motor magnet 380 in operating, closes contacts 381, thereby completing an obvious circuit to the relay 360. Relay 360 in operating contacts 361 opens the circuit to magnet 380 which now restores and advances wipers 395 through 398 one step. Magnet 380 opens the circuit to relay 360 at contacts 381. In restoring, relay 360 again completes the circuit to magnet 380 at contacts 361. This inter-action between relay 360 and magnet 380 continues until the wipers 395 through 398 engage their respective 8th contacts. At this time wiper 398 encounters the ground potential applied to the extra control (E. C.) conductor 124 of the calling line by wiper 238 being engaged with its grounded 3rd contact, which completes a series circuit for relays 260, 350 and 360. This circuit may be traced as follows: from wiper 238 engaged with the grounded 3rd contact, contacts 224, the upper winding of relay 260, conductor 117, wiper 197 and engaged 8th contact, conductor 124, cable C174, conductor 124, 8th contact engaged by wiper 398, upper windings of relays 350 and 360, contacts 314 and to battery.

In operating "X" contacts 357, relay 350 completes an obvious locking circuit for itself over its lower winding to ground at contacts 315, at contacts 351 the circuit to relay 300 is opened, at contacts 352 and 353 the talking conductors of subscriber H are extended through into the equipment and line relay 305 is now maintained operated over the closed subscriber's loop and a second dial tone (this time from the code call equipment) is transmitted back to the calling subscriber in a well-known manner. Contacts 354 open a point in the previous energizing circuit of relay 305, contacts 355 apply ground to the control conductors of the calling subscriber for busying said subscriber, contacts 356 alter the previous energizing circuit for relays 350 and 360, however relay 350 remains locked operated while relay 360 restores and at contacts 358 the circuit to magnet 380 is maintained open. In operating, relay 360 opens the circuit to magnet 380 at contacts 361 and remains operated only long enough for relay 350 to lock operated and open the circuit to magnet 380.

Relay 260 operates as previously described in the section entitled "Executive cut-in." However, as cut-through relay 220 is energized and relay 260 operates contacts 267, the locking circuit to relay 140 is opened and relay 140 restores. In restoring, relay 140 opens the circuit to line relay 120, which restores and opens the circuit to the hold relay 130. Relay 130, in restoring, opens the holding circuit of the cut-through relay 220, which in restoring opens the circuit to relay 260 and at contacts 230 completes the "homing" circuit for motor magnet 280 which steps its wipers 232 through 239 to normal. The finder-connector link is now completely released and conditioned for future calls and the executive is now connected with the code call equipment.

Relay 300 restores and opens another point in the first energizing circuit of line relay 305 at contacts 301.

Upon receipt of the second dial tone, the executive (subscriber H) dials the first digit "2" of the code call number "22" which is individual to subscriber J. Line relay 305 will operate in the usual and well-known manner and deenergize and energize two times. At the beginning of the first pulse, line relay 305 will deenergize and at contacts 307 complete circuits to the series relay 410 and motor magnet 413. This circuit may be traced as follows: from ground at contacts 377, contacts 307, 313, conductor 379 and (1) up through the lower winding of relay 410 to battery, (2) contacts 422 and through the winding of motor magnet 413 to battery. It will be noted that due to their construction, relay 310 will remain operated during dialing and relay 410 will remain operated during pulsing. In operating, relay 410 opens contacts 412, thereby removing ground from wipers 488 and 489 while pulsing. At the end of the first pulse, relay 305 reenergizes and the circuit to relay 410 and magnet 413 is opened, however, only magnet 413 restores and in restoring rotates wipers 486 through 489 one step. At the beginning of the second pulse, relay 410 is maintained operated and magnet 413 is again energized in the same manner when relay 305 restores. At the end of the second pulse, relay 305 again reoperates and as this is the last pulse of the first digit, relay 410 restores shortly after magnet 413 restores. In restoring, magnet 413 rotates wipers 486 through 489 another step so that now the wipers are engaged with their respective second contacts. As relay 410 restores contacts 412, a circuit is completed for storage relay 460, which may be traced from ground at contacts 315, conductor 384, contacts 426, conductor 383, contacts 337, conductor 382, contacts 412, wiper 488 and engaged second contact, break contact of armature 443 and through the winding of relay 460 to battery.

In operating contacts 461 through 464, relay 460 prepares various paths for future markings of the contacts accessible by wiper 486. At contacts 465 relay 460 prepares a future circuit for itself in series with relay 440 and at contacts 466 completes a circuit for the relay 330. This circuit extending from ground at contacts 315, conductor 384, contacts 426, conductor 383, contacts 337, conductor 382, contacts 412, wiper 488 and engaged second contact, armature 443 and break contact, contacts 465, 466, 445, up over conductor 362 and through the winding of relay 330 to battery.

In operating, relay 330 locks itself operated over an obvious circuit to the multiple grounded contacts accessible by wiper 487 at "X" contacts 332. At contacts 331 a point in the dial tone circuit is opened, at contacts 334 a point in the operate circuit of relay 490 is closed, at contacts 335 an obvious circuit is completed to motor magnet 413 from ground encountered by wiper 487, at contacts 336 a point in an alternate energizing circuit for magnet 413 is opened and at contacts 337 ground is removed from wipers 488 and 489. Relay 440, however, now has ground applied on both sides of its winding and cannot operate. Relay 460 is maintained operated by the same ground applied on the right-hand side of relay 440. This circuit may be traced from ground encountered by wiper 487, conductor 363, up through "X" contacts 332, conductor 362, down to contacts 445, 466, 465 and through the winding of relay 460 to battery.

In operating, magnet 413 opens its energizing circuit at contacts 414 and thereby restores. In restoring, magnet 413 advances its wipers 486 through 489 one step and recloses its own circuit at contacts 414. This interaction between magnet 413 and its contacts 414 continues until wipers 486 through 489 have restored to normal. At this time no ground is encountered by wiper 487 and relay 330 restores, and the last-traced operating circuit for relay 460 is opened. However, now relay 460 remains operated over a circuit in series with relay 440 and relay 440 operates. This circuit may be traced from ground at contacts 315, down through conductor 384, through the winding of relay 440, up through contacts 465 and through the winding of relay 460 to battery. In operating armatures 442 through 444 with their respective make contacts, relay 440 prepares circuits for the second group of storage relays so as to be able to store the second digit of the code call number when dialed, at contacts 445 a point is opened in the second holding circuit for relay 460 and at armature 441 and its break contact, dial tone is further removed from the calling line.

The second and last digit "2" of the code call number "22" is now dialed and line relay 305 deenergizes and energizes twice in response to the pulses of the second digit in the same manner as previously described for the first digit. Relay 410 and magnet 413 also operate as previously described for the first digit and it will be noted that after the end of the last pulse and after relay 305 has again energized, wipers 486 through 489 will have stepped to their second contacts as magnet 413 restores and as relay 410 restores contact 412, ground is applied to wipers 488 and 489 and a circuit is completed for the storage relay 490 over a path similar to that traced for the storage relay 460. In operating contacts 491 through 494 relay 490 prepares various paths for future markings of contacts accessible by wiper 486 and at contacts 495 and 496 a circuit is completed for relay 330 over a path similar to the one previously described by relay 460.

Relay 330 operates as previously described to energize magnet 413 and magnet 413 operates and restores to return the switch to normal also as previously described. Relay 490 is maintained operated and relay 420 is shunted over circuits similar to the ones traced for relays 460 and 440. After the switch has been restored by magnet 413, magnet 413 and relay 330 restore. The shunt is removed from both sides of relay 420 and relay 420 operates in series with relay 490 over a circuit similar to the one traced for relays 460 and 440.

In operating contacts 421 relay 420 applies a marking potential to the second and sixth contacts accessible by wiper 486. This marking ground may be traced as follows: from ground at contacts 402, contacts 421, to the left to the sixth contact, and to the right to armature 472 and break contact, contacts 463, 452, 434 and up to the second contact. At contacts 422, relay 420 opens the pulsing circuit to motor magnet 413, at contacts 424 a point in the last-mentioned energizing circuit of relay 330 is opened, at contacts 425 a circuit is completed for relay 345 which may be traced from ground at contacts 315, conductor 384, contacts 425, conductor 389, contacts 327, 375, 343 and through the winding of relay 345 to battery. The operation of the equipment for the first code ringing cycle will now be discussed.

Relay 345 is constructed as being slow to operate, however, upon each operation of contacts 346 a "splash" of dial tone is sent out over the calling line thereby indicating to the calling subscriber the code being rung, at contacts 348 an obvious circuit is completed to the slow-to-operate relay 340 and at contacts 349 a circuit is completed to the relay 365. This circuit extending from ground at contacts 339, conductor 392, contacts 407, conductor 399, contacts 349 and through the winding of relay 365 to battery. Relay 365 completes an obvious circuit to code sounders such as 390 and 391 at contacts 366, thereby causing them to operate and ring once. Relay 340 has completely operated and at contacts 342 prepares a circuit for magnet 413 and opens the circuit to relay 345 at contacts 343, which allows relay 345 to restore. In restoring, relay 345 opens the circuit to relay 365 at contacts 349 and contacts 348 opens the circuit to relay 340. Before slow-to-operate relay 340 has had time to release, however, a circuit is completed to magnet 413 at contacts 347, this circuit extending from ground at contacts 347, contacts 374, 342, 336, conductor 368, contacts 423 and through the winding of magnet 413 to battery.

Magnet 413 operates and prepares to rotate its wipers 486 through 489. Relay 340 now restores and in so doing opens the circuit to magnet 413 at contacts 342. Magnet 413 advances its wipers one step upon releasing. Relay 340, in restoring contacts 343 completes the previously traced circuit to relay 345. In operating, relay 345 again completes circuits to relays 365 and 340 and at contacts 346 a second "splash" of dial tone is sent out over the calling line. Relay 365 operates and completes the circuit to the code sounders causing them to ring a second time. In operating, relay 340 again opens the circuit to relay 345 and prepares the circuit for magnet 413. Relay 345, in releasing, opens the circuits to relays 365 and 340 and again completes the circuit to magnet 413. Relay 365 releases and magnet 413 operates, after which, relay 340 completely restores and opens the circuit to magnet 413. Relay 345 is constructed so as to be slow to operate and also somewhat slow to release, therefore magnet 413 restores and advances its wipers a second step, completing a circuit for relay 330, which extends from battery through the upper winding of relay 330, conductor 362, wiper 486 and its engaged marked second contact, contacts 434, 452, 463, 472, 421 and 402 to ground. In operating, relay 330 opens the last-mentioned operating circuit of magnet 413 at contacts 336, at contacts 335 completes a circuit to magnet 413 by way of wiper 487, at contacts 338 completes a circuit to prepare for operating relay 415 in its first step, opens a point in the circuit to relay 365 at contacts 339 and at "X" contacts 332 locks itself operated to the ground encountered by wiper 487. Relay 415 does not operate at this time since the ground extending from contact 338 energizes both the upper and lower windings in opposition. The circuit for the upper winding of relay 415 may be traced from ground at contacts 338, conductor 393, contacts 419, 427, the upper winding of relay 415, contacts 429 and the associated resistance to battery. The circuit for the lower winding of relay 415 may be traced over a similar path, but extending through the lower winding directly to battery. Magnet 413 operates, prepares to step its wipers, opens its own circuit at contacts 414 and restores, thereby advancing wipers 486 through 489 one step. Magnet 413 continues to operate and restore in the same manner until the wipers are restored to normal (as shown) at which time wiper 487 no longer encounters ground and magnet 413 and relay 330 restore. As relay 330 restores contacts 38, the circuit is opened to relay 415. However the opening of the circuit to relay 415 causes an inductive surge of current in the windings of the relay, resulting in the closing of "X" contacts 418 (first step operation). The closing of "X" contacts 418 completes a series aiding circuit through both windings of relay 415 causing it to operate fully (second step). This circuit may be traced as follows: from ground at contacts 15, contacts 386, conductor 387, "X" contacts 418, upper winding of relay 415 and the lower winding of relay 415 to battery. The two windings of relay 415 now aid in the operation of relay 415 through its second step. In restoring contacts 339, relay 330 again prepares a circuit to relay 365. In operating, relay 415 completes an obvious circuit for the relay 430 at contacts 416, at contacts 417 prepares a circuit for relay 400, at contacts 429 removes the battery and resistance from the upper winding of relay 415 and at contacts 419 opens the first energizing circuit of relay 415.

In operating armatures 431 through 435 with their respective make contacts, relay 430 completes the marking circuit for marking the contact, corresponding to the second digit of the code call number, accessible by wiper 486. The marking of the contact may be traced as follows: from ground at contacts 402, contacts 421, and to the left to contact number 6, and to the right through contact 477, 493, 482, and the make contact of armature 434 up to the second contact of the contact bank.

It will be noted that relays 345 and 340 have continued to operate and deenergize one another. However their operations have no effect on the equipment until relay 330 restores, at which time the closing of contacts 339 prepares a circuit for relay 365 as mentioned above. During the subsequent operation of relay 345 a previously traced circuit is again completed to relay 365 at contacts 349. Relay 345 also completes a circuit to relay 340, however relay 365 operates, completing a circuit to code sounders such as 390 and 391 causing them to ring once. Relay 340 now operates and prepares a circuit to magnet 413 and opens the circuit to relay 345 at contacts 342 and 343 respectively. In restoring, relay 345 opens the circuit to relay 340 and completes a previously traced circuit to magnet 413 at contacts 348 and 347 respectively and at contacts 349 opens the circuit to relay 365 which now restores. In operating, magnet 413 prepares to step its wipers 486 through 489. Relay 340 now restores and opens the circuit to magnet 413 and completes the circuit to relay 345. Magnet 413 restores and advances its wipers one step. In operating, relay 345 again completes the circuit to relays 340 and 365. In operating, relay 365 again completes the circuit to code sounders such as 390 and 391 causing them to ring a second time. Relay 340, in operating opens the circuit to relay 345 and prepares a circuit for magnet 413. In restoring, relay 345 opens the circuit to relays 340 and 365 and completes the circuit to magnet 413. Magnet 413 again prepares to advance its wipers and in restoring, relay 340 opens the circuit to magnet 413 and completes the circuit to relay 345. Magnet 413 restores and advances its wipers a second step. However, before relay 345 has had time to again operate and as wiper 486 engages its marked second contact, a previously traced circuit from ground at contacts 402 is completed to relay 330.

Relay 330 operates as previously described, with the exception that at contacts 334 a circuit is prepared for operating relay 400 in its first step. Relay 400 is similar to relay 415 and does not operate at this time. A "homing" circuit is completed to magnet 413 at contacts 335 by relay 330 and therefore magnet 413 restores its wipers to normal, at which time the circuit to relay 330 is opened and relay 330 restores. As relay 330 restores contacts 334, the circuit is opened to relay 400. However, the opening of the circuit to relay 400 causes an inductive surge of current in the windings of the relay 400, resulting in the closing of "X" contacts 405 (first step operation). The closing of "X" contacts 405 completes a series aiding circuit through both windings of relay 400 causing it to operate fully (second step). This circuit may be traced from ground at contacts 315, contacts 386, conductor 387, "X" contacts 405, through the lower winding of relay 405 and the upper winding of relay 405 to battery.

In operating, relay 400 removes dial tone from the calling line at contacts 401, at contacts 402 and 403 the marking ground is removed from one circuit path and changed to another so that now the third contact available by wiper 486 is marked with the ground potential. This circuit may be traced from ground at contacts 403 up to the third contact. At contacts 404, battery and resistance are removed from the lower winding of relay 400, at contacts 406, an alternate energizing path for relay 345 is opened but relay 345 may still operate over the previously described one, at contacts 407 a point in the circuit of relay 365 is opened and at contacts 408 prepares a point in the circuit of relay 385.

In operating, relay 345 completes the circuit for relay 340, which upon operating, prepares a circuit for magnet 413 and opens the circuit for relay 345 as described before. Relay 345, in restoring, opens the circuit for relay 340 and completes the circuit for magnet 413. In restoring, relay 340 opens the circuit to magnet 413 and again completes the circuit to relay 345. In restoring, magnet 413 advances its wipers one step. This inter-action between relays 345 and 340 in connection with magnet 413 continues until the restoration of magnet 413 steps its wipers to their third contacts, at which time, wiper 486 encounters ground on its marked third contact and completes a previously traced circuit to relay 330. During this third operation of the code call switch it will be noted that the relay 365 is not operated to operate the code sounders 390 and 391 to create a pause between codes.

In operating contacts 335, relay 330 completes a previously described circuit for operating magnet 413 and at contacts 338 a circuit is completed for relay 385, this circuit extending from ground at contacts 338, conductor 393, down through contacts 408, conductor 394 and through the winding of relay 385 to battery. In operating, magnet 413 restores its wipers to normal in the same manner as previously described. In operating contacts 386, relay 385 opens the circuit to relays 400 and 415. If magnet 413 has not fully restored its wipers to normal, as relay 415 restores, a circuit would be prepared for relay 415, but it could not stay energized and therefore would not affect the equipment. Assuming, however, that magnet 413 has restored its wipers and thereby opened the circuit of relay 330, which in restoring will open the circuit to relays 415 and 385 at contacts 338. As relay 385 is made slow-to-release the circuit to relay 415 is open at contacts 386 and relay 415 will stay restored. The first code ringing cycle has now been completed.

Relay 345 will operate and start a second code ringing cycle, operating the equipment in the same manner as described for the first cycle. The code ringing will continue until the paged party answers the call or the calling party replaces his receiver to thereby release the connection.

After hearing his code being rung the paged party (subscriber J) answers the code call by dialing the common three digit code call answering number 906. In answering, subscriber J removes the receiver of the telephone from the nearest station and seizes a finder connector link such as shown in Figures 1 and 2 in the same manner as described in the section entitled "Local to local calls." The code call answering number 906 is then dialed and the equipment operates in the same manner as described in the above-mentioned section, with the wipers of the connector stopping on their 9th contacts in response to the 1st digits, stopping on their 19th contacts after the 2nd digit, and finally stopping on their 25th contact after the third digit. Upon completion of dialing the last digit, it will be found that the equipment is operated such that the call corresponds to a first line group call and wipers 232, 234 and 236 of the connector are engaged with their respective 25th contacts. As wiper 236 engages its 25th contact a circuit is completed for the cut-through relay 220, this circuit extending from ground at contacts 229, conductor 128, contacts 133, conductor 116, contacts 265, 253, the lower winding of relay 220, contacts 271, 247, wiper 236 and its engaged 25th contact, conductor 304, cable C344 and to the resistance and battery on conductor 304.

In operating contacts 221 and 222, relay 220 completes a series circuit for ring cut off relay 210 and the answering relay 320. This circuit being traced as follows: ground at contacts 204, contacts 213, 222, 243, wiper 234 and engaged 25th contact, conductor 303, cable C344, conductor 303, contacts 324, upper winding of relay 320, contacts 322, conductor 302, cable C344, conductor 302, 25th contact engaged with wiper 232, contacts 241, 221, 211, 201 and through the upper winding of relay 210 to battery at interrupted generator. Relay 210 operates as described in the previously mentioned section and in operating, relay 320 closes "X" contacts 326 to complete a holding circuit from ground at contacts 315 through its lower winding and closes contacts 321 and 323 to thereby connect the talking conductors of the answering line (subscriber J) with subscriber H. At contacts 322 and 324 relay 320 opens its original energizing circuit, at contacts 325 an alternate maintaining circuit for relay 310 is completed to provide for last-party-release of the code call equipment and at contacts 327 an alternate circuit is opened to relay 345. The code ringing will continue until the code sending cycle has been completed, at which time the full operation of relay 400 will open the other circuit to relay 345. Relay 345 in restoring, opens the circuit to relay 340, thereby stopping the equipment from sending further codes. The talking connection from the calling subscriber H and the called subscribed J is now completed and includes the code call finder connected directly to the calling line, the code call circuit, and the finder-connector link used by the called subscriber J in answering his code call. The talking connections include the heavy talking conductors. Talking battery for the calling line being fed through line relay 305, while talking battery for the called line is fed through line relay such as 120 of the finder-connector link.

After conversation and in response to the replacing of the receivers, the equipment is released in the following manner: the finder-connector link is released in the same manner as described in the previous section entitled "Local to local calls" and the release of the code call equipment is initiated by the last party to replace his receiver.

When the called subscriber J replaces his receiver the line relay 120 and release relay 130 in the finder-connector link release as previously described. The restoration of relay 130 opens the locking circuit to relay 220 which restores and disconnects ground at contacts 228 from wiper 236 and conductor 304 thereby removing one of the grounds which holds release relay 310 of the code call switch operated through contacts 325. When the calling subscriber H replaces his receiver the line relay 305 of the code call switch restores and at contacts 306 also disconnects one of the grounds which holds release relay 310 operated. Therefore, the last party to restore his receiver releases relay 310. When the hold relay 310 restores contacts 315, relays 350, 320, 410, 420, 440, 460 and 490 restore. Relay 350 removes the busy condition from the code call finder and the code call equipment is at normal and ready to handle future calls.

*Special alarm*

The code call equipment is sometimes used for sending special alarms such as fire alarms or starting and dismissal signals. Usually the special alarms are of greater importance than regular code calls and hence, should have right-of-way. The special alarm is a non-coded uninterrupted signal which may be initiated by any equipment that will apply a ground potential to the special code alarm lead. The grounding means as illustrated in Figure 3 is a locking key such as 328.

Assuming for the present that the code call equipment is idle, a special alarm may be initiated and sent in the following manner: key 328 is closed and locked, thus completing an obvious circuit for relay 370. In operating contacts 372, relay 370 completes a busying circuit for any incoming code calls, at contacts 373 a circuit is prepared for relay 330, at contacts 374 the circuit to magnet 413 is opened, at contacts 376 an obvious circuit is completed for relay 345 and at contacts 378 prepares a circuit for relay 365. Relay 345 operates as described in the previous section, completing circuits for relays 340 and 365 at contacts 348 and 349 respectively. Relay 365 operates as previously described, completing the circuits to the code sounders such as 390 and 391, causing them to ring once. Relay 340 opens the circuit to relay 345 allowing relay 345 to restore. In restoring, relay 345 opens the circuit to relays 365 and 340 and in restoring relay 340 completes the circuit to relay 345. Relay 345, in energizing again completes the circuit to relays 340 and 365. This interaction between relays 340 and 345 continues to cause relay 365 to operate the code sounders until the key 328 is released, at which time relay 370 restores, causing relay 345 to restore and which in turn releases relays 340 and 365.

Assuming now that the code call equipment is in use and that relay 370 is operated in the middle of a sending cycle, as relay 370 closes contacts 373 a circuit will be completed for relay 330, this circuit extending from ground encountered by wiper 487, conductor 363, contacts 373, conductor 362 and through the upper winding of relay 330 to battery. Relay 330, in operating contacts 335 completes a previously traced circuit for magnet 413 and wipers 486 through 489 are advanced to normal. During the above mentioned operation, relay 370 has operated relay 345, which in turn operates relays 340 and 365, causing the alarm to be sent out in the same manner as described in the above paragraph. Upon completion of the alarm being sent out, relay 370 is restored to normal and the equipment prepares to code ring the desired party by starting at the beginning of a ringing cycle in which relay 345 operates relay 365 to give the first ring and operates relay 340 to interrupt the circuit of relay 345 and prepares motor magnet 413 for stepping its wipers. The remainder of the operation of the equipment and its release being described in the previous section entitled "Code call."

Having described the invention, what is considered new and is desired to have protected by Letters Patent will be pointed out in the following claims.

What is claimed is:

1. In a telephone system, a single level automatic switch having two sets of wipers and bank contacts, a first group of party lines terminating in the first set of bank contacts and accessible to the first wiper set, a second group of party lines terminating in the second set of bank contacts and accessible to the second wiper set, a first and a second station on said party lines, a ring determining position and a wiper switching position terminating in said bank contact sets, means for directively operating said wipers of said switch in response to the receipt of incoming digits to stop said wipers in engagement with said bank contacts in accordance with the received digits, ring determining apparatus in said switch operated in response to said switch wiper stopping in engagement with said ring determining position for thereafter selectively signalling the second stations of said lines in either line group, and wiper switching apparatus in said switch operated in response to said switch wiper stopping in engagement with said wiper switching position for switching from said first set of wipers to said second set of wipers to extend calls to said second group of lines.

2. In a telephone system, a single level automatic switch having two sets of wipers and bank contacts, a first group of lines terminating in the first set of bank contacts and accessible to said first set of wipers, a second group of lines terminating in the second set of bank contacts and accessible to said second set of wipers, a wiper switching position terminating in a bank contact in said first bank contact set, a code calling position terminating in a bank contact in said first bank contact set, a called subscribers' line in said second line group terminating in bank contacts in said second bank contact set corresponding to said code calling position bank contact in said first bank contact set, code calling apparatus for code signalling called subscribers who are away from their telephones, means for directively operating the wipers of said switch in response to the receipt of incoming digits to stop said wipers in engagement with said bank contacts in accordance with said received digits, wiper switching apparatus in said switch operated in response to said wipers stopping in engagement with said wiper switching position bank contact for switching from said first wiper set to said second wiper set to extend calls to lines in said second line group, means for completing a connection with said called subscribers' line in case said switch wipers subsequently stop in engagement with said bank contacts corresponding to said called subscribers' line and said code calling position after initially stopping in engagement with said wiper switching position, and means for initiating the operation of said code call apparatus in case said switch wipers initially stop in engagement with said code calling position bank contact and the bank contacts of said called subscribers' line.

3. In a telephone system, a single level automatic switch having two sets of wipers and bank contacts, a first group of party lines terminating in the first set of bank contacts and accessible to the first wiper set, a second group of party lines terminating in the second set of bank contacts and accessible to the second wiper set, means including a motor magnet in said switch operated responsive to impulses received from one of said lines when calling, for directively operating said wipers in one, two, three, four, or five directive movements to complete connections to various ones of said lines, a source of signalling current, circuit means including a plurality of relays controlled responsive to said directive movements, for controlling said circuit means to connect said source to one of said wipers in either wiper set to selectively signal only one of the first parties in either line group on each call in case the called line was connected with in one, two, three, or four directive movements, and said last means dependent upon a predetermined first directive movement connecting said source to another one of said wipers in either wiper set to selectively signal only one of the second parties in either line group on each call in case the called line was connected with in two, three, four, or five directive movements.

4. In a telephone system, a single level automatic switch having two sets of wipers and bank contacts, a first group of party lines terminating in the first set of bank contacts and accessible to the first wiper set, a second group of party lines terminating in the second set of bank contacts and accessible to the second wiper set, means including a motor magnet in said switch operated responsive to impulses received from one of said lines when calling, for directively operating said wipers in one, two, three, four, or five directive movements to complete connections to various ones of said lines; a source of signalling current, circuit means and a plurality of relay means controlled responsive to said directive movements, for controlling said circuit means to connect said source of signalling current to one of said wipers in said first set in case the called line is connected with in one, two, or three directive movements to selectively signal only the first parties in said said first party line groups, wiper switching means included in said relay means operated dependent upon a predetermined first directive movement, for connecting said source of signalling current to a corresponding one of said wipers in said second set in case the called line is connected with in two, three, or four directive movements to selectively signal only the first parties in said second party line group; and ring reversing means included in said relay means operated dependent upon a different predetermined first directive movement for connecting said source of signalling current to a second one of said wipers in said first set in case the called line is connected with in two, three, or four directive movements to selectively signal only the second parties in said first party line group and said ring reversing means and said wiper switching means operated dependent on two successive different predetermined first directive movements for connecting said source of signalling current to a corresponding second one of said wipers in said second set in case said called line is connected with in three, four, or five directive movements to selectively signal only the second parties in said second party line group.

5. In a telephone system, a single level automatic switch having two sets of wipers and bank contacts, a first group of party lines terminating in the first set of bank contacts and accessible to the first wiper set, a second group of party lines terminating in the second set of bank contacts and accessible to the second wiper set, means including a motor magnet in said switch operated responsive to impulses received from one of said lines when calling, for directively operating said wipers in one, two, three, four, or five directive movements to complete connections to various ones of said lines; a source of signalling current, circuit means and a plurality of relay means controlled responsive to said directive movements, for controlling said circuit means to connect said source of signalling current to one of said wipers in said first set in case the called line is connected with in one, two, or three directive movements to selectively signal only the first parties in said first party line group, said plurality of relay means controlled in another instance for controlling said circuit means to connect said source of signalling current to a corresponding one of said wipers in said second set in case the called line is connected with in two, three, or four directive movements to selectively signal only the first parties in said second party line group; said plurality of relay means controlled in a further instance for controlling said circuit means to connect said source of signalling current to a second one of said wipers in said first set in case the called line is connected with in two, three, or four directive movements to selectively signal only the second parties in said first party line group, said plurality of relay means controlled in a last instance for controlling said circuit means to connect said source of signalling current to a corresponding second one of said wipers in said second set in case said called line is connected with in three, four, or five directive movements to selectively signal only the second parties in said second party line group; ring reversing means included in said relay means and controlled responsive to the first predetermined directive movement of the wipers for determining that the second parties in either line group will be selectively signalled by said source, and wiper switching means included in said relay means and controlled responsive to a different first predetermined movement of said wipers, or a second predetermined directive movement of the wipers following said first predetermined directive movement for determining that the said corresponding wipers in said second set will be used to selectively signal only the parties in said second line group.

6. In a telephone system, a single level automatic switch having two sets of wipers and bank contacts, a first group of party lines terminating in the first set of bank contacts and accessible to the first wiper set, a second group of party lines terminating in the second set of bank contacts and accessible to the second wiper set, a first and a second station on said party lines, a ring determining position terminating in said bank contact sets, means for directively operating said wipers of said switch in response to the receipt of incoming digits to stop said wipers in engagement with said bank contacts in accordance with the received digits, ring determining apparatus in said switch operated in response to said switch wipers stopping in engagement with said ring determining position for thereafter selectively signalling the second stations of said lines in either line group and supplying battery feed to all said second stations of either line group.

7. In a telephone system, a line, means for at times making said line busy, a control conductor associated with said line and grounded whenever said line is busy, a connector switch having access to said line, a busy relay and a cut-in relay included in said switch, an executive's line, means operated in response to the calling of said line by said executive when said line is busy for causing said switch to connect with said grounded conductor, said busy relay initially energized in response to said connection with said grounded control conductor and subsequently locked energized independently thereof, means responsive to said busy relays' operation for completing a busy tone circuit to said executive, means controlled by said executive for operating said cut-in relay after hearing said busy tone, means for releasing said busy relay in response to said operation of said cut-in relay, a circuit for locking said operated cut-in relay energized over said grounded control conductor and for releasing said cut-in relay in response to the removal of ground from said control conductor when said line becomes idle, and a signalling circuit completed to said line in response to the release of said cut-in relay.

8. In a telephone system, a plurality of connector switches having bank contacts and wipers accessible thereto, a normal position bank contact for each of said wipers, a distributor relay individual to each of said connector switches, said distributor relays being operated when their associated connector switches are idle and restored when their associated connector switches are busy, a reset relay, an operating circuit for said reset relay, contacts controlled responsive to the restoring of the last of said distributor relays in rotation for completing said operating circuit to operate said reset relay, distributor relay circuits completed responsive to the operation of said reset relay for energizing all said distributor relays corresponding to idle ones of said connector switches, a locking circuit for each distributor relay including a wiper and said normal position bank contact of its corresponding connector switch for maintaining said energized distributor relays in their operated positions, and a chain circuit controlled by said operated distributor relays for allotting said idle connector switches for use in rotation.

9. In a telephone system as claimed in claim 8 including means controlled over said chain circuit for seizing said allotted idle connector switches for use in rotation, means for releasing each distributor relay by opening said locking circuits in response to the seizing of the corresponding connector switch, and a series circuit controlled by all said distributor relays in their released positions for operating said reset relay to thereby reoperate the distributor relays corresponding to idle connector switches over said distributor relay circuits.

10. In a telephone system, a plurality of connector switches having wipers and bank contacts accessible thereto, a normal position bank contact for each of said wipers, a distributor relay individual to each of said connector switches, means for momentarily energizing all of the distributor relays corresponding to idle ones of said connector switches to prepare said idle connector switches for seizure in rotation, and a locking circuit for each distributor relay including the normal position bank contact of the associated switch for maintaining said energized distributor relays in their operated positions after said momentary energizations only in case each said locking circuit is completed over a wiper and said normal position bank contact of its corresponding connector switch.

11. In a telephone system, a switch having access to a plurality of contact banks, a calling station, a first and a second group of storage relays, means including a wiper in said switch operated responsive to impulses received from said calling station for selecting a certain relay of said first and a certain relay of said second groups of said storage relays, means for operating said selected storage relays, contacts controlled by said operated selected relays for placing a marking potential at certain contacts on a certain one of said contact banks, and means for again operating said switch to transmit signals in accordance with said marking potential.

12. In a code calling system, code call numbers each comprising two digits, a calling station, means at said calling station for dialing a desired one of said code call numbers to thereby transmit trains of impulses corresponding to said digits, a first and a second group of storage relays, a code call switch having access to a plurality of contact banks, means including a wiper in said code call switch operated responsive to receipt of said impulse train corresponding to said first dialed digit for selecting a certain relay of said first storage relay group, means for causing said switch to release subsequent to said first operation of said switch; said second means and said wiper of said switch reoperated responsive to receipt of said impulse train corresponding to said second dialed digit for selecting a certain relay of said second storage relay group, means for causing said switch to release subsequent to said second operation of said switch, means for operating said selected storage relays, and contacts controlled by said operated storage relays for marking certain contacts on a certain one of said contact banks.

13. A code calling system as claimed in claim 12 including means for reoperating said switch a third and a fourth time for transmitting codes corresponding to said markings, means for causing said switch to release subsequent to said third and a fourth operations of said switch, and means for reoperating said switch a fifth time to a third contact of said certain contact bank for creating a silent interval between codes.

ROY W. JONES.

REFERENCES CITED

The following references are of record in the file of this patent:

UNITED STATES PATENTS

| Number | Name | Date |
|---|---|---|
| 1,546,113 | Albert | July 14, 1925 |
| 1,732,186 | Wicks | Oct. 15, 1929 |
| 1,877,883 | Kahn | Sept. 20, 1932 |
| 1,889,229 | Tharp | Nov. 29, 1932 |
| 2,137,518 | Wicks | Nov. 22, 1938 |
| 2,239,902 | Peterson | Apr. 29, 1941 |
| 2,322,966 | Erwin | Oct. 26, 1943 |
| 2,424,281 | McClew et al. | July 22, 1947 |